Patented May 21, 1935

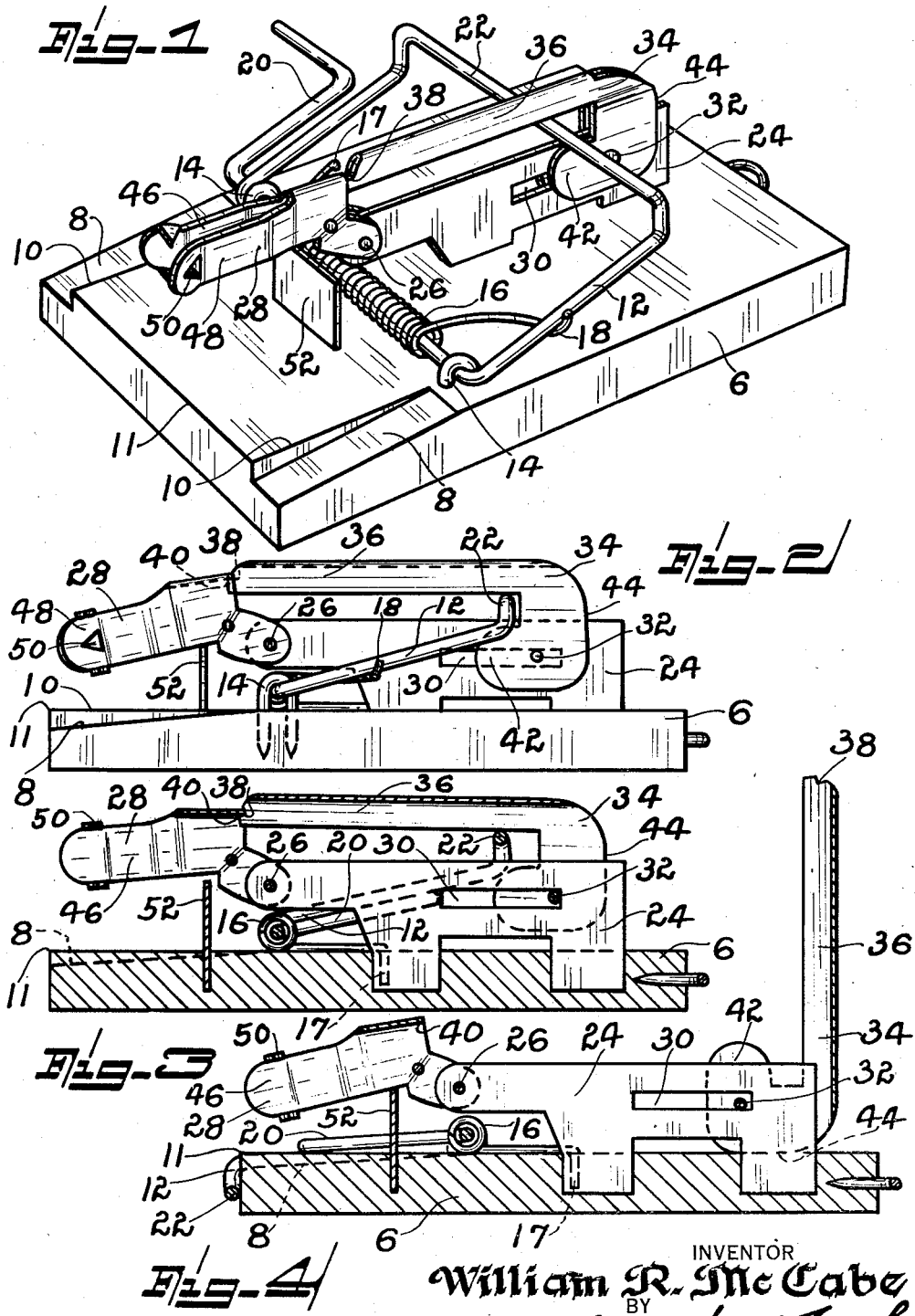

2,002,095

UNITED STATES PATENT OFFICE 2,002,095

ANIMAL TRAP

William R. McCabe, Seattle, Wash., assignor to Ora A. McCabe, Seattle, Wash.

Application March 9, 1934, Serial No. 714,858

7 Claims. (Cl. 43—81)

My invention relates to that class of small animal trapping devices normally intended to catch single animals and which by virtue of the fact that it can be made in a variety of sizes I prefer to term an animal trap.

Simple animal traps have usually been built on a wooden or metal base, and have as the animal securing means a bail pivoted near the center of the base and adapted to be revolved against a tortion spring, also suitable latch or trigger securing means is provided to hold the bail in its set position. These traps are normally characterized by a rather flimsy construction due largely to the necessity for cheap manufacture and they have the requirement that they must be very sensitive so that an animal cannot secure the bait from the trigger without springing the trap. These requirements have produced rodent traps which require a rather steady hand to set to the end that they will be set in a manner that they can be sprung easily and many people are of the temperament that they find considerable difficulty in properly setting one of these traps. It is to overcome this deficiency of existing equipment that I have provided my animal trap. Its outstanding characteristic is the ease with which it can be set and the fact that it has a setting position wherein the bail is held securely without any danger of the trap being sprung and then when the trap is placed in its final position it is armed and in the process of arming, the fingers of the operator are well away from the end where any danger of being caught by the bail exists.

The principal object of my present invention is therefore to provide an animal trap which may be safely and easily set by an inexperienced person.

Other and more specific objects will be apparent from the following description taken in connection with the accompanying drawing, wherein Figure 1 is a perspective view showing my animal trap in its armed position. Figure 2 is a side elevation of my trap showing the same in its set position but not armed so that it can function as a trap. Figure 3 is a longitudinal sectional view showing my trap in its armed position ready for use. Figure 4 is a view similar to Figure 3 excepting the trap has been sprung.

Referring to the drawing, throughout which like reference characters indicate like parts, 6 designates the base of my trap. This may be made of any suitable material usually wood or pressed metal. It has been found desirable however to cut away a portion of each edge as at 8 so as to form a relatively sharp edge 10. This coacts with the side portions of the bail in the same manner as the sharp edge at 11 coacts with the cross member of the bail to provide a more secure holding means for any animal which springs the trap. Pivotally secured to base 6 is the bail member 12. This is of the more or less conventional construction and in my present illustrations I have shown it as being held in place by the staples 14. A tortion spring 16 encircles the pivot portion of the bail, one end of the spring being anchored to the wood base as at 17 while the other is looped under the bail as at 18. This construction is more or less conventional. The possible novelty of this structure is vested in the setting handle 20 which is formed as a continuation of the wire forming the bail and the offset cross portion 22.

The outstanding feature in my present invention resides in the trap setting and releasing means. This is made up of a support member 24 which is fixedly secured to the base 6. It provides a pivot at its forward end at 26 for the bait carrier or trigger 28 and at its opposite end it is provided with a slot 30 which confines the pivot 32 of latch member 34. The proportions of these parts can probably best be obtained from a careful study of the various views. The latch is provided with the long straight portion 36 terminating in the nook 38 which is arranged to suitably engage the bait carrier at 40. It will be noted in Figure 3 particularly that there is a downward slant to the bearing edge of the nook. This insures a ready release and is a very desirable feature. In the illustrations I have shown the support 24 as a solid piece of metal and the latch 34 as a folded member. A reversal of these parts would accomplish the same purpose of course. The latch is further provided with a longitudinal extension at 42 which is desirable in that it provides a steadiness to the latch and prevents side play which might tend to cause the latch to bind as it was being released. It is further desired to point out that the distance from slot 30 to the upper face of base 6 must be balanced against the distance from pivot 32 to the end of latch 34 as 44 so that when in the released position it can assume the position shown in Figure 4.

The bait carrier which is pivotally secured to the support at 26, I prefer to form of folded material after the showing particularly in Figure 1, so that two side members 46 and 48 are provided. Now, if the bait carrier is folded from fairly resilient material the two members 46 and 48 can be spread apart so as to secure the bait between them. This can be further improved by making inwardly extending indentations as 50.

Disposed below the bait carrier 28 and at a reasonable distance from pivot 26 is a rest 52. The purpose of this rest is to limit the downward movement of the bait carrier about its pivot, substantially as shown in Figure 2. This member should of course be sufficiently low that when the trap is in its armed position shown in Figure 3 there will be sufficient clearance above the rest so that the trap can be sprung.

Method of operation

In setting my trap the bail 22 is revolved against spring 16 to the position shown in Figures 1, 2 and 3. Latch member 34 is brought over it and secured under the upper surface of the folded metal of the bait carrier after the showing of Figure 2. It will be understood it is believed that gravity would normally place the bait carrier in the position shown in Figure 2 and then to secure the engagement with nook 38 it is necessary to slide the latch longitudinally of slot 30 so that the engagement can be effected. The face of the nook will limit the movement however. The trap will now be in the position shown in Figure 2. In this position the trap is set but still cannot be sprung as it is impossible to press the trigger or bait carrier member 28 downwardly beyond the position shown in Figure 2. To arm the trap, or in other words to put it in the position it should be left when it is set for rodents, latch 34 is grasped out at the end beyond the bail as 44 and pulled to the right as shown in Figure 2. A limit to this movement is provided by the end of slot 30 and when this is reached as shown in Figure 3 the trap is in its armed position ready to be sprung. This setting can all be accomplished without any danger of the fingers being caught in the trap and at the same time a very sensitive setting of the trap is accomplished.

The foregoing description and the accompanying drawing are believed to clearly disclose a preferred embodiment of my invention but it will be understood that this disclosure is merely illustrative and that such changes in the invention may be made as are fairly within the scope and spirit of the following claims:

Having thus fully described my invention, what I claim as new and desire to secure by Letters Patent is:—

1. The combination in a trap with a base, a support on the base having a slot therein, an L-shaped latch located over the support, and a pivotal support for the latch having a slidable bearing in the slot, of a spring-operated bail hinged on the base and retained between the latch and the support, a bait-carrier pivoted on the base below the free end of the latch, and co-acting means on the free end of the latch and said bait-carrier to retain the latch in engagement with the bait-carrier, whereby the latch may be moved to set the trap.

2. In an animal trap, the combination with a base, a support on the base, an L-shaped latch located over the support, and a pivotal support for the latch having a movable bearing on the support, of a spring-actuated bail hinged on the support and retained between the latch and the support, a bait-carrier pivoted on the support below the free end of the latch, a stop on the base to limit downward movement of the free end of the bait-carrier, and co-acting means at the free ends of said latch and bait-carrier for engaging these members, whereby the latch may be moved to set the trap.

3. In an animal trap, the combination with a base, a support on the base having a slot therein, an L-shaped latch located over the support, and a pivot pin for the latch having a slidable bearing in the slot, of a spring-actuated bail hinged on the base and retained between the latch and the support, a bait-carrier pivoted on the base, a stop on the base for said carrier, and co-acting means on the free ends of the latch and carrier to retain these members in engagement, whereby the latch may be slid to set the trap.

4. The combination in a trap with a base, a support on the base, an L-shaped latch located over the support, and a pivot for the latch having a movable bearing on the support, of a rectangular bail retained between the latch and said support, said bail including a pivoted bar, an operating spring coiled about said bar, a crank handle forming an extension of said bar, a bait-carrier pivoted on the support below the free end of the latch, and coacting means on the free ends of said latch and carrier for engaging said members, whereby the latch may be moved to set the trap after the crank handle has been turned.

5. The combination in a trap with a base, a support on the base having a longitudinal slot, and a pivot for the latch having a slidable bearing in said slot, of a rectangular bail retained between the latch and said support, said bail including a pivoted bar, an operating spring coiled about said bar, a crank handle forming an extension of said bar, a bait-carrier pivoted on the support, a stop on the base to limit downward movement of said carrier, and co-acting means on the free ends of said latch and carrier for engaging said members, whereby the latch may be slid on its pivot to set the trap after the crank handle has been turned.

6. The combination in a trap with a base, a support on the base, a longitudinally movable latch pivoted in the support, of a spring-actuated bail retained between said latch and support, a bait-carrier pivoted on said support, said latch having a notch at its free end, and a projection on the bait-carrier engaging said notch, whereby the latch may be moved to set the trap.

7. The combination in a trap with a base, a support on the base, a longitudinally movable latch pivoted in the support, and a spring actuated bail retained between said latch and support, of a bait-carrier pivoted on said support, a stop on the base to limit downward movement of said carrier, said latch having a notch at its free end, and a projection on the free end of the bait-carrier engaging said notch, whereby the latch may be moved to set the trap.

WILLIAM R. McCABE.